No. 634,129. Patented Oct. 3, 1899.
A. BYNELL.
CATTLE TIE.
(Application filed Jan. 28, 1899.)
(No Model.)

WITNESSES.
INVENTOR
AUGUST BYNELL
BY Paul & Hawling
HIS ATTORNEYS

UNITED STATES PATENT OFFICE.

AUGUST BYNELL, OF GRANTSBURG, WISCONSIN.

CATTLE-TIE.

SPECIFICATION forming part of Letters Patent No. 634,129, dated October 3, 1899.

Application filed January 28, 1899. Serial No. 703,644. (No model.)

*To all whom it may concern:*

Be it known that I, AUGUST BYNELL, of Grantsburg, county of Burnett, State of Wisconsin, have invented certain new and useful Improvements in Cattle-Ties, of which the following is a specification.

My invention relates to devices or appliances for tying cattle in stalls, stock-cars, &c., and is designed especially as an improvement of the devices used for the same purpose shown and described in Letters Patent No. 252,424, granted to me January 17, 1882.

The object of my invention is to provide a cattle-tie of such construction that the animals are prevented from moving about in the stalls, thus dispensing with the usual partitions between them.

The invention consists generally of an upper yoke to rest upon the neck of the animal, said yoke having looped ends and a spring and formed with upwardly-turned flanges, forming with the under side of the yoke a convex surface in cross-section to the sides and under face of the yoke, a lower yoke, chains adjustably connecting said yokes, and a chain pivotally secured to said lower yoke.

Further, the invention consists in upper and lower yokes, chains adjustably connecting said yokes, and a chain having one end swiveled to the lower yoke and its other end adapted to be secured to the walls or manger and provided with a branch chain also adapted to be secured to the wall or manger.

Further, the invention consists in various constructions and combinations, all as hereinafter described, and particularly pointed out in the claims.

Figure 1:
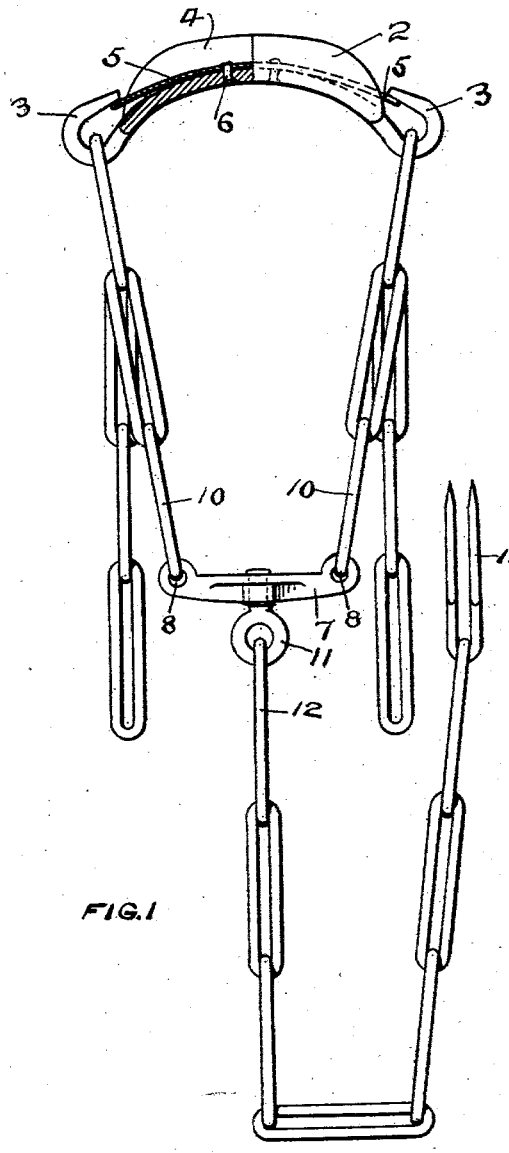
Figure 2:
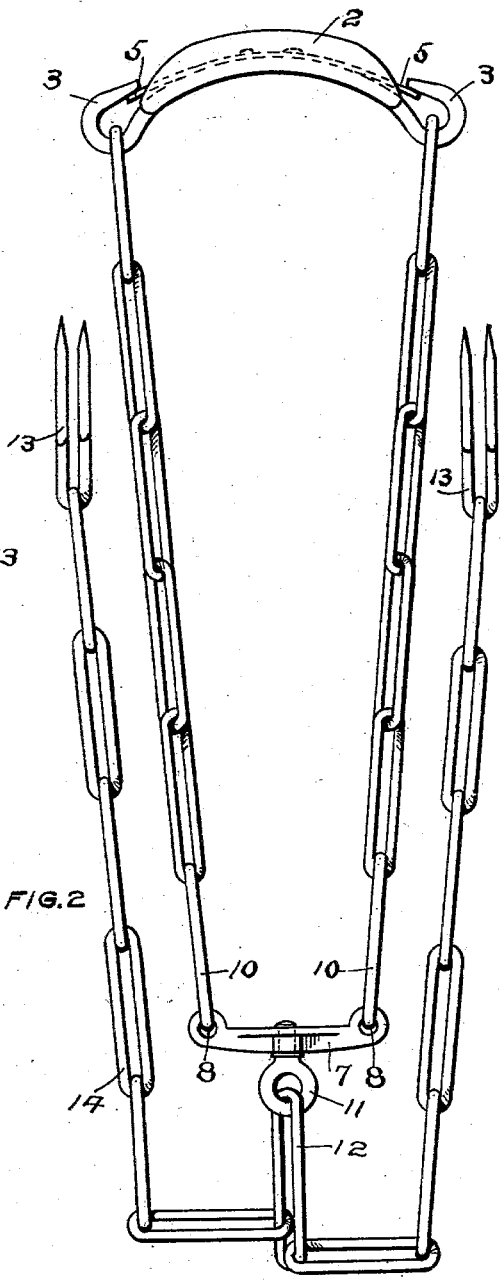
Figure 3:
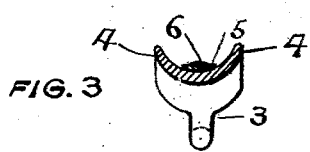

In the accompanying drawings, forming part of this specification, Figure 1 is a plan view of my improved cattle-tie, showing the manner of adjusting the chains between the yokes. Fig. 2 is a similar view showing the tie provided with a branch chain. Fig. 3 is a cross-section of the upper yoke.

In the drawings, 2 is the upper yoke, preferably slightly curved to fit the neck of the animal and provided with loops formed by the turned-up ends 3 and between the loops with upwardly-turned flanges 4, which present a rounded surface and prevent the edges of the yoke from wearing the neck of the animal. Between the upwardly-turned flanges upon the upper side of the yoke I prefer to provide a flat spring 5, held in place, preferably near its middle portion, by a rivet 6 and having its ends underlapping the looped ends 3, forming therewith spring-snaps to prevent the connections between the yokes from being accidentally disengaged from the looped ends of the yoke. At the lower end of the tie I provide a yoke 7, preferably shorter than the yoke 2, having openings or eyelet-holes 8 in its ends, to which the lower ends of chain 10 are secured, the links at the upper ends of said chains being passed over said loops and held in place by the ends of said spring. A swivel 11 is preferably provided in the yoke 7, to which one end of the chain 12 is connected, the other or free end of the chain having a staple 13, by means of which the tie may be secured to the wall or manger of the cattle-stall.

I do not confine myself to the use of the chain for securing the device to the manger, as a rope or cable may be used for this purpose, if preferred, and I may also use ropes or similar devices in place of the chains 10. In Fig. 2 I have shown a branch chain 14, having one end connected to a link of the chain 12 and its free end provided with a staple corresponding to the staple 13 described above. The purpose of this branch chain is to permit the tie to be secured to the wall of the stall or manger upon opposite sides of the animal, thus preventing the animal from moving about and obviating the necessity of partitions between the stalls.

I prefer to make the yokes of malleable iron, and all the parts of the device may be made by any blacksmith and put together at a comparatively small expense.

While I have shown the preferred construction and arrangement of the parts, I do not confine myself to the details, as obviously they may be varied by any man skilled in matters pertaining thereto.

I claim as my invention—

1. A cattle-tie comprising an upper curved yoke 2 having looped ends 3 and a spring 5 between said loops, said yoke between its ends being formed with upwardly-turned flanges 4, which together with the under face of the yoke form a convex surface in cross-section to the sides and under face of the yoke, a lower yoke 7, chains 10 secured to said yoke 7 and having adjustable connections with the looped ends of the yoke 2, and a chain 12 swiveled to the yoke 7 and having means for securing the chain to the floor or wall of a manger, substantially as described.

2. A cattle-tie, comprising an upper yoke 2 having looped ends 3 and a spring 5 between said loops, a lower yoke 7, chains 10 secured to said yoke 7 having adjustable connections with the looped ends of said yoke 2, and the diverging chains 12 and 14 having swivel connection to the yoke 7 and provided with staples for securing the diverging chains to the wall of the manger or at opposite points and thus take the place of partitions between the stalls substantially as described.

AUGUST BYNELL.

Witnesses:
 WILLIAM HOFFSTEAD,
 GILBERT HANSON.